June 25, 1929.  H. N. PUTNAM  1,718,254
WALL CONDUIT
Filed March 28, 1928   2 Sheets-Sheet 1

June 25, 1929.    H. N. PUTNAM    1,718,254
WALL CONDUIT
Filed March 28, 1928    2 Sheets-Sheet 2
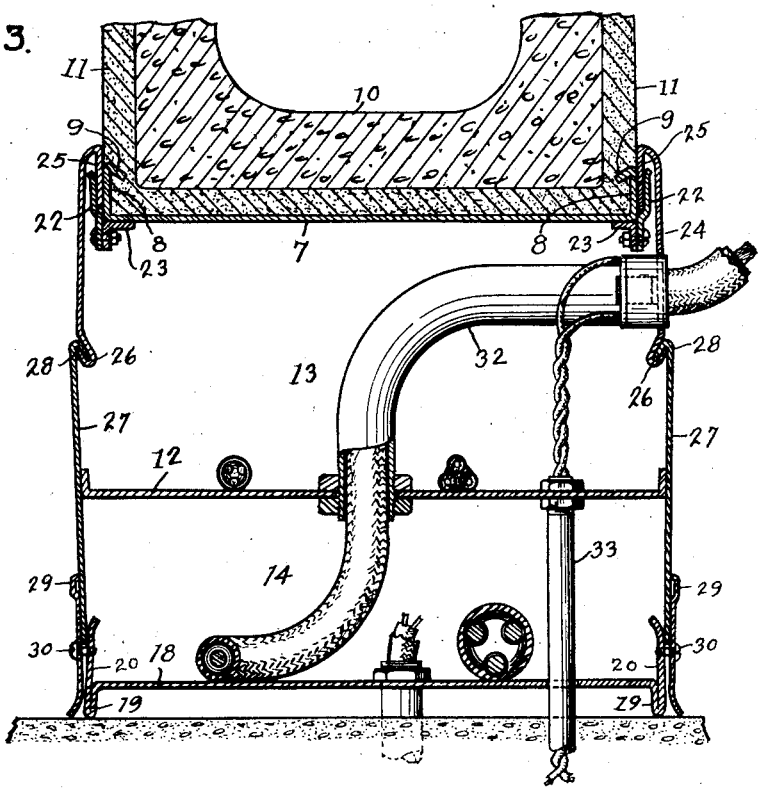
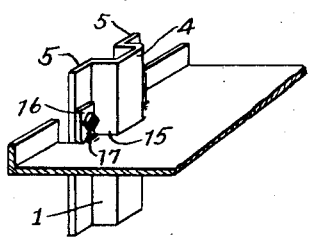
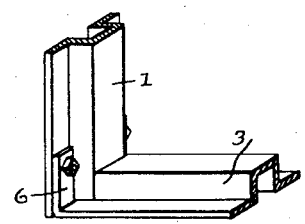
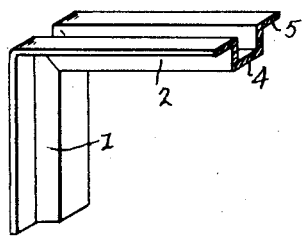
Inventor
Herbert N. Putnam
By
Evans & McCoy
Attorneys Patented June 25, 1929.

1,718,254

UNITED STATES PATENT OFFICE.

HERBERT N. PUTNAM, OF LAKEWOOD, OHIO.

WALL CONDUIT.

Application filed March 28, 1928. Serial No. 265,294.

This invention relates to wall conduits and more particularly to a wall conduit of the type shown and described in my copending applications Serial No. 191,565, filed May 16, 1927, and Serial No. 246,203, filed Jan. 12, 1928, wherein a conduit for electric wiring and for gas and other pipes leading to various parts of the building is in the form of a structural unit set into the body of the wall and forming a structural part of the wall.

The present invention has for an object to provide a wall conduit of the type above referred to, which is inexpensive to manufacture, easy to install, and which possesses sufficient strength to form an integral part of the wall and to support the superimposed portion of the wall structure.

A further object of the invention is to provide a built in wall conduit which may be constructed entirely of metal, which possesses great strength and which provides a maximum space upon the interior thereof for wiring, piping and the like.

With the above and other objects in view, the invention may be said to comprise the wall conduit as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 3 is a transverse section through the conduit taken on the line indicated at 3—3 in Fig. 1.

Fig. 4 is a detail view showing the attachment of the partition member to the supporting standards of the conduit.

Fig. 5 is a detail view showing the connection between the bottom cross members and the standards.

Fig. 6 is a detail view showing the connection between the top cross members and the standards.

Figure 1:
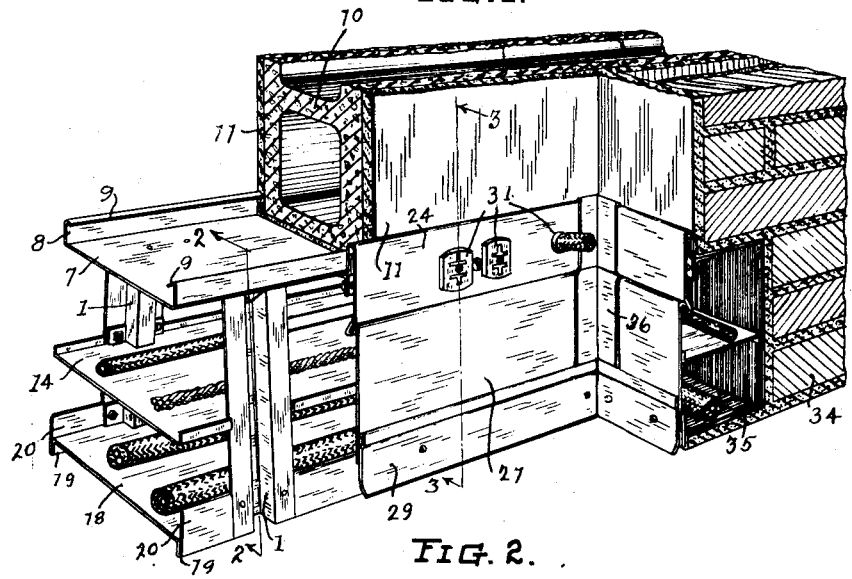
Figure 1 is a sectional perspective view showing a portion of the wall of a building to which the present invention is applied.
Figure 2:
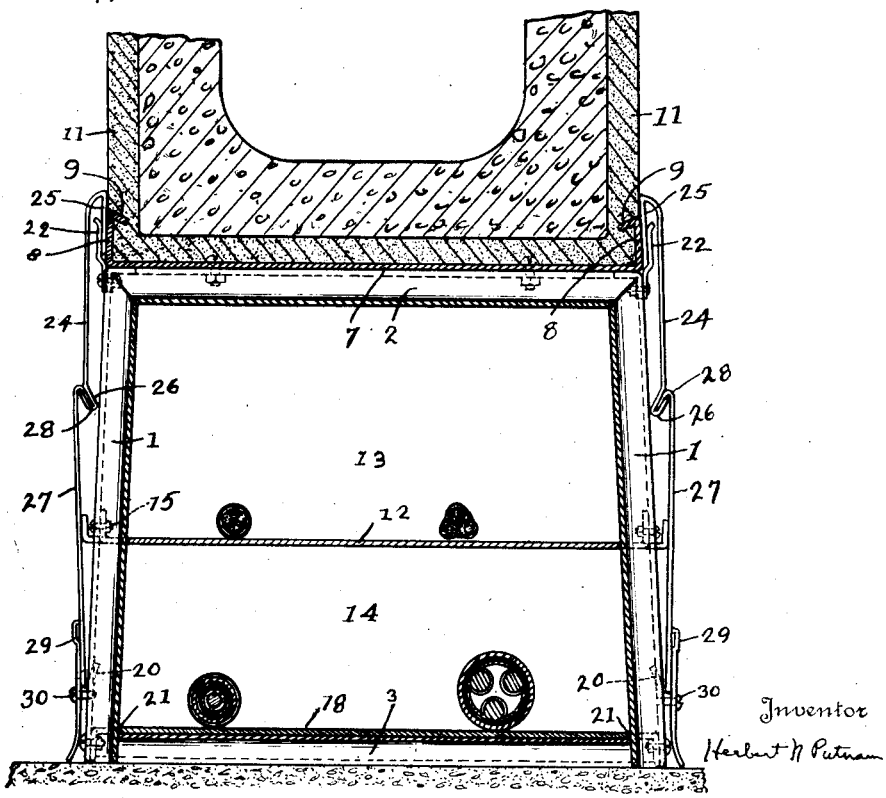
Fig. 2 is a transverse section through the conduit taken on the line indicated at 2—2 in Fig. 1.

Referring to the accompanying drawings, the wiring conduit of the present invention is formed of metal members and the load carrying portions of the conduit are in the form of substantially rectangular frames positioned at intervals along the length of the conduit. These frames consist of vertical standards 1, which are rigidly connected at their upper ends by top cross members 2 and at their lower ends by bottom cross members 3.

The standards and the cross members may be of any suitable cross sectional shape, the cross members as herein shown being of identical form in cross section, each having a central channel portion 4 and having side flanges 5 extending laterally from the channel portions 4. The channel portions 4 of the standards 1 project inwardly from the side flanges, the channel portions of the top cross members project downwardly from the side flanges and the channel portions of the bottom cross members project upwardly from the side flanges. The frame members are rigidly joined together at the corners of the frame by any suitable method. As herein shown, the bottom cross member at the ends thereof has its channel portion 4 cut away to receive the channel portions 4 of the standards, the projecting end portions 6 of the flanges of the bottom members being bent upwardly and bolted to the inner sides of the flanges of the standards, as shown in Fig. 5.

The supporting frames of the conduit are preferably slightly wider at the bottom than at the top, the standards 1 having a slight inward inclination for a purpose which will be hereinafter more fully explained.

The top wall of the conduit is formed by a channel shaped metal member 7 which rests upon the top cross members of the supporting frames and is attached to the side flanges of said cross members. The top member 7 is provided with upwardly extending flanges 8 which terminate at their upper ends in inwardly bent portions 9. The channel top member 7 is of substantially the same width as the wall above the conduit and the body portion 10 of the wall is built directly upon the member 7. The flanges 8 of the channel member lie in the plane of the outer surface of the plaster 11 applied to the wall and these flanges, together with the ledges 9 at the upper edges thereof form plaster grounds to facilitate the troweling of the plaster along the upper edge of the conduit.

Intermediate the top and bottom of the conduit, there is a partition member 12 which extends across the space between the supporting standards 1 at opposite sides of the conduit and divides the conduits into upper and lower compartments 13 and 14, one compartment being adapted to receive low tension conductors and the other compartment being adapted to receive high tension conductors. The partition member 12 is provided at its opposite edges with notches 15 to receive the standards 1 and may be secured to the standards 1 by any suitable means such as tongues 16 bent up from the notched portions and attached to the flanges 5 of the standards by bolts 17.

The bottom wall of the conduit is formed by a channel shaped sheet metal member 18 which has side flanges bent downwardly and back upon themselves to provide downwardly projecting flanges 19 of double thickness and flanges 20 projecting upwardly above the web portion of the member 18. The downwardly projecting flanges 20 serve to support the bottom wall of the conduit above the floor level so that the wiring is supported above the floor level and is protected against contact with water or dampness on the floor surface. The channel member 18 is provided at intervals along opposite sides thereof with notches 21 which are of a shape to receive the standards 1 with the flanges 5 thereof flush with the flanges 20 of the bottom member, as shown in Fig. 1.

Spaced clips 22 are attached to suitable portions of the conduit such as angle brackets 23 which are secured to the top member 7 of the conduit and these clips project upwardly parallel with the outer faces of the flanges 8 of the top member to provide securing means for an outlet panel 24, the outlet panel 24 being provided at its upper edge with a reversely turned flange 25 adapted to engage between the clips 22 and flanges 8. The outlet panel is of a width less than the depth of the upper compartment 13 and has its lower edge bent to form an inwardly and downwardly inclined channel 26 which serves to retain a removable panel 27 which covers the lower portion of the compartment 13 and the upper portion of the compartment 14. The panel 27 is provided with an inturned flange 28 at its upper edge which fits in the channel 26 of the outlet panel. The lower edge of the panel 27 is secured between the upstanding flange 20 of the bottom member and a mop strip 29 which is secured to the flange of the bottom member by means of screws 30.

The taper of the supporting frame permits the outlet panel to be offset outwardly from the standards 1 sufficiently to accommodate the inwardly extending flange receiving channel 26 at the lower edge thereof which bears upon the outer faces of the standards so that the standards form a rigid backing for the outlet panel holding the same in upright position.

When it is desired to gain access to the interior of the conduit, it is simply necessary to loosen the mop strip screws 30 sufficiently to free the lower portion of the panel 27, whereupon it may be lifted out of engagement with the channel 26 of the outlet panel. The removable panel 27 affords access to both the upper and lower compartments of the conduit so that it is unnecessary to disturb the outlet panel or any of the wiring connections in order to obtain access to the interior of the conduit.

Conductor cables from the lower compartment 14 may extend through tubes 32 connecting the partition member 12 with the outlet panel 24 so that the low tension cables cannot become crossed with high tension conductors extending to the outlet panel. The cables may be led into the conduit at any point along the length or width thereof, the lead in conduits through the floor being suitably connected to the bottom wall of the conduit. Supply line connections to upper compartment may be made through tubes 33 extending through the lower compartment 14 and attached at their upper ends to the partition member 12.

As shown in Fig. 1 of the drawing, the panel 24 may be provided with outlets 31 of any desired form and the various conductor cables within the conduit may be permanently attached to these outlets.

As herein shown, the conduit of the present invention forms a base for a partition wall, but it will be obvious that this conduit may extend intermediate the top and bottom of the wall or may extend only partially through the wall. As shown in Fig. 1 of the drawing, the outside wall 34 of the building is provided with a conduit 35 built into the wall and forming a part thereof with which the partition conduit communicates.

Since the panels 24 and 27 forming the side walls of the conduits are substantially flush with the walls, it is unnecessary to provide mitered joints at the corners, the spaces between the ends of the panels at either inside or outside corners being covered by an angle corner strip 36 which overlies the adjoining ends of the panels and extends down behind the mop strip, the upper end of the strip being hooked over the top of the panels.

It will be apparent that the rigid frame members at intervals along the length of the conduit give the conduit the necessary load supporting capacity and that by employing these load supporting frames, the conduit walls may be all formed of relatively light metal, making a light but substantial and inexpensive construction. Furthermore, it will readily be seen that the longitudinal conduit members may be quickly and easily assembled on the supporting frames and secured thereto so that the labor cost incident to the building of the conduit is quite small.

The conduits of the present invention when employed in partition walls provide wiring compartments each opening to opposite sides of the wall so that the same supply lines may be employed for rooms on both sides of the wall, thus eliminating independent supply lines on opposite sides of the wall.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The combination with a wall, of a conduit structure built into the wall and forming a support for a portion of the wall, said conduit having a top wall forming a base for the superposed wall structure, one side of the conduit being substantially flush with a face of the wall in which the conduit is located, longitudinally spaced standards for supporting said top wall of the conduit, and panels forming a side wall of said conduit, certain of said panels being removable to afford access to the interior of the conduit.

2. The combination with a wall, of a conduit structure built into the wall and forming a support for superposed portions of the wall, said conduit comprising supporting frames, composed of standards and cross members rigidly connected to the standards at their upper and lower ends, longitudinal members forming the top and bottom walls of the conduit and resting on the top and bottom cross members respectively, of the frame, and panels overlying said standards and forming the side walls of said conduit, certain of said panels being removable to afford access to the interior of the conduit.

3. The combination with a wall, of a conduit structure built into the wall and forming a support for superposed portions of the wall, said conduit comprising supporting frames composed of standards and cross members rigidly connected to the standards at their upper and lower ends, longitudinal members forming the top and bottom walls of the conduit and resting on the top and bottom cross members respectively, of the frames, longitudinal partition members extending across the space between the standards and secured thereto intermediate the ends thereof, and panels overlying said standards and forming the side walls of said conduit, certain of said panels being removable to afford access to the interior of the conduit.

4. A combined conduit and wall support comprising supporting frames each having standards and cross members connecting the upper ends of the standards, a member forming the top wall of the conduit, and resting on said cross members, and panels overlying said standards and forming the side walls of said conduit, certain of said panels being removable to afford access to the interior of said conduit.

5. A combined conduit and wall support comprising supporting frames each having standards and cross members connecting the upper ends of the standards, a member forming the top wall of the conduit and resting on said cross members, a member forming the bottom wall of the conduit, and panels covering the space between the top and bottom members and forming the side walls of the conduit, certain of said panels being removable to afford access to the interior of said conduit.

6. A combined conduit and wall support comprising supporting frames each having standards and cross members connecting the upper ends of the standards, a channel shaped member forming the top wall of the conduit and resting on said cross members, said channel member having upwardly extending side flanges adapted to form plaster grounds, and panels overlying said standards and forming the side walls of the conduit, certain of said panels being removable to afford access to the interior of said conduit.

7. A combined conduit and wall support comprising a top wall forming a base for the superposed wall structure, longitudinally spaced standards for supporting said top wall, and panels forming the side walls of the conduit, certain of said panels being removable to afford access to the interior of the conduit.

8. A combined wall base and conduit comprising a top wall forming a base for the superposed wall structure, longitudinally spaced standards for supporting said wall from the floor, a bottom wall supported above the floor, and panels forming the side walls of the conduit, certain of said panels being removable to afford access to the interior of the conduit.

In testimony whereof I affix my signature.

HERBERT N. PUTNAM.